(12) United States Patent
Gawthorp

(10) Patent No.: US 10,371,364 B2
(45) Date of Patent: Aug. 6, 2019

(54) PORTABLE POWER SUPPLY SYSTEM

(71) Applicant: Kevin Gawthorp, Milwaukee, WI (US)

(72) Inventor: Kevin Gawthorp, Milwaukee, WI (US)

( * ) Notice: Subject to any disclaimer, the term of this patent is extended or adjusted under 35 U.S.C. 154(b) by 262 days.

(21) Appl. No.: 15/405,000

(22) Filed: Jan. 12, 2017

(65) Prior Publication Data
US 2018/0198286 A1    Jul. 12, 2018

(51) Int. Cl.
F21V 33/00     (2006.01)
F21V 23/04     (2006.01)
H01M 2/10      (2006.01)
F21W 131/00    (2006.01)
F21V 21/26     (2006.01)

(52) U.S. Cl.
CPC .......... *F21V 23/04* (2013.01); *H01M 2/1005* (2013.01); *H01M 2/1061* (2013.01); *F21V 21/26* (2013.01); *F21V 33/00* (2013.01); *F21W 2131/00* (2013.01); *H01M 2220/30* (2013.01)

(58) Field of Classification Search
CPC . H02J 5/00; F21V 23/04; F21V 33/00; H01R 11/28; H01R 13/73
See application file for complete search history.

(56) References Cited

U.S. PATENT DOCUMENTS

| | | | |
|---|---|---|---|
| 3,963,972 A | 6/1976 | Todd | |
| 5,111,127 A | 5/1992 | Johnson | |
| 5,277,350 A * | 1/1994 | Thornbury, Jr. | A63H 27/002 242/390.8 |
| D425,018 S | 5/2000 | Madura et al. | |
| 6,799,993 B2 | 10/2004 | Krieger et al. | |
| 7,273,983 B1 * | 9/2007 | Rintz | F21S 8/035 174/66 |
| 9,153,978 B2 | 10/2015 | Reade et al. | |
| 9,461,488 B2 * | 10/2016 | Shum | H02M 7/003 |
| 2002/0171391 A1 | 11/2002 | Batts-Gowins | |
| 2004/0121225 A1 * | 6/2004 | Krieger | H01M 2/1005 429/96 |
| 2007/0024236 A1 * | 2/2007 | Arakelian | H01M 2/1072 320/107 |
| 2007/0115672 A1 * | 5/2007 | Nelson | F21V 21/088 362/396 |
| 2009/0038673 A1 | 2/2009 | Ware | |
| 2015/0171632 A1 | 6/2015 | Fry et al. | |
| 2016/0186973 A1 * | 6/2016 | Chien | F21S 8/035 362/253 |

* cited by examiner

Primary Examiner — Jared Fureman
Assistant Examiner — Emmanuel Dominique

(57) ABSTRACT

A portable power supply system for providing portable electrical power includes a battery that has a positive terminal and a negative terminal. A box is provided and the battery is positioned in the box. A lid is removably coupled to the box. A pair of first light emitters is provided and each of the first light emitters is removably coupled to the lid to selectively emit light outwardly from the lid. An inverter is removably coupled to the lid and the inverter may be electrically coupled to an electric device thereby facilitating the inverter to supply AC current to the electric device.

12 Claims, 6 Drawing Sheets

PORTABLE POWER SUPPLY SYSTEM

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

(2) Description of Related Art Including Information Disclosed Under 37 CFR 1.97 and 1.98

The disclosure and prior art relates to power supply devices and more particularly pertains to a new power supply device for providing portable electrical power.

BRIEF SUMMARY OF THE INVENTION

An embodiment of the disclosure meets the needs presented above by generally comprising a battery that has a positive terminal and a negative terminal. A box is provided and the battery is positioned in the box. A lid is removably coupled to the box. A pair of first light emitters is provided and each of the first light emitters is removably coupled to the lid to selectively emit light outwardly from the lid. An inverter is removably coupled to the lid and the inverter may be electrically coupled to an electric device thereby facilitating the inverter to supply AC current to the electric device.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
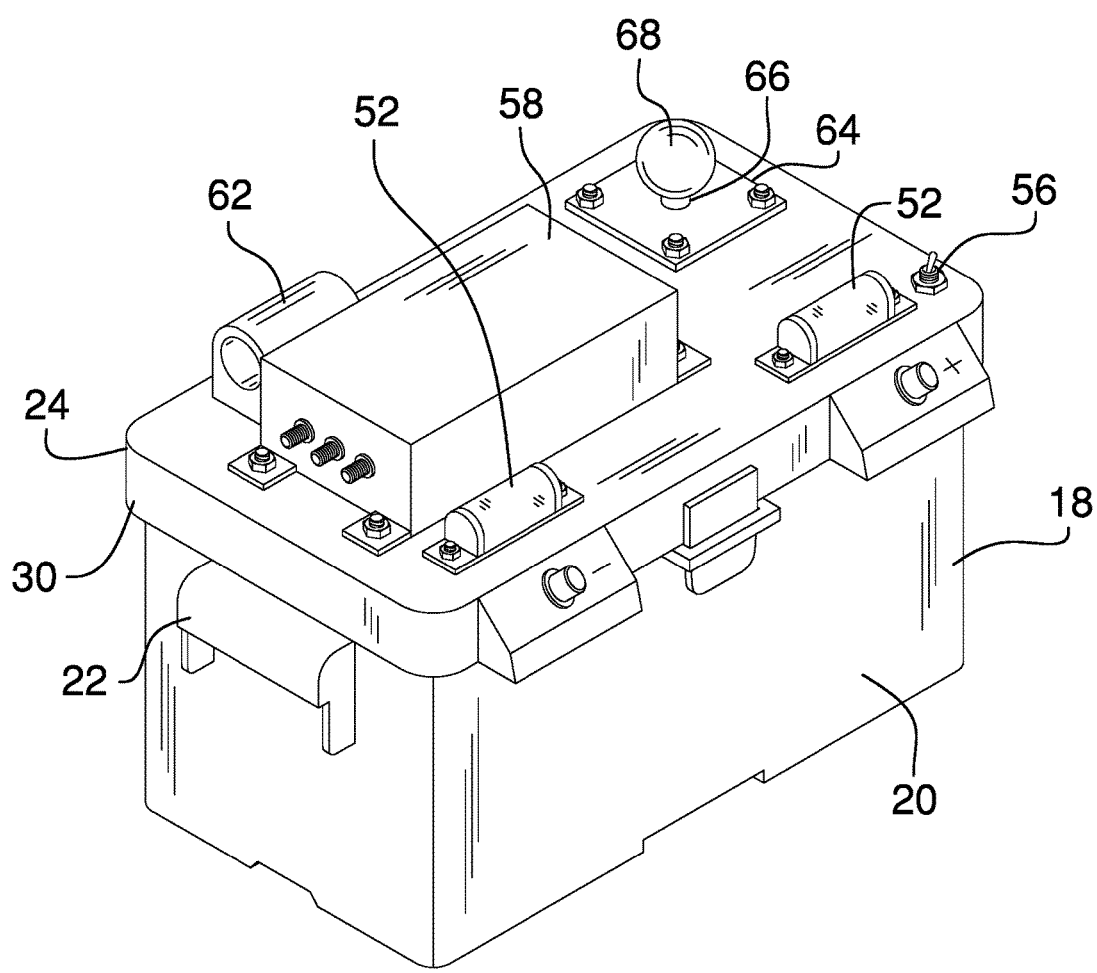
FIG. 1 is a front perspective view of a portable power supply system according to an embodiment of the disclosure.
Figure 2:
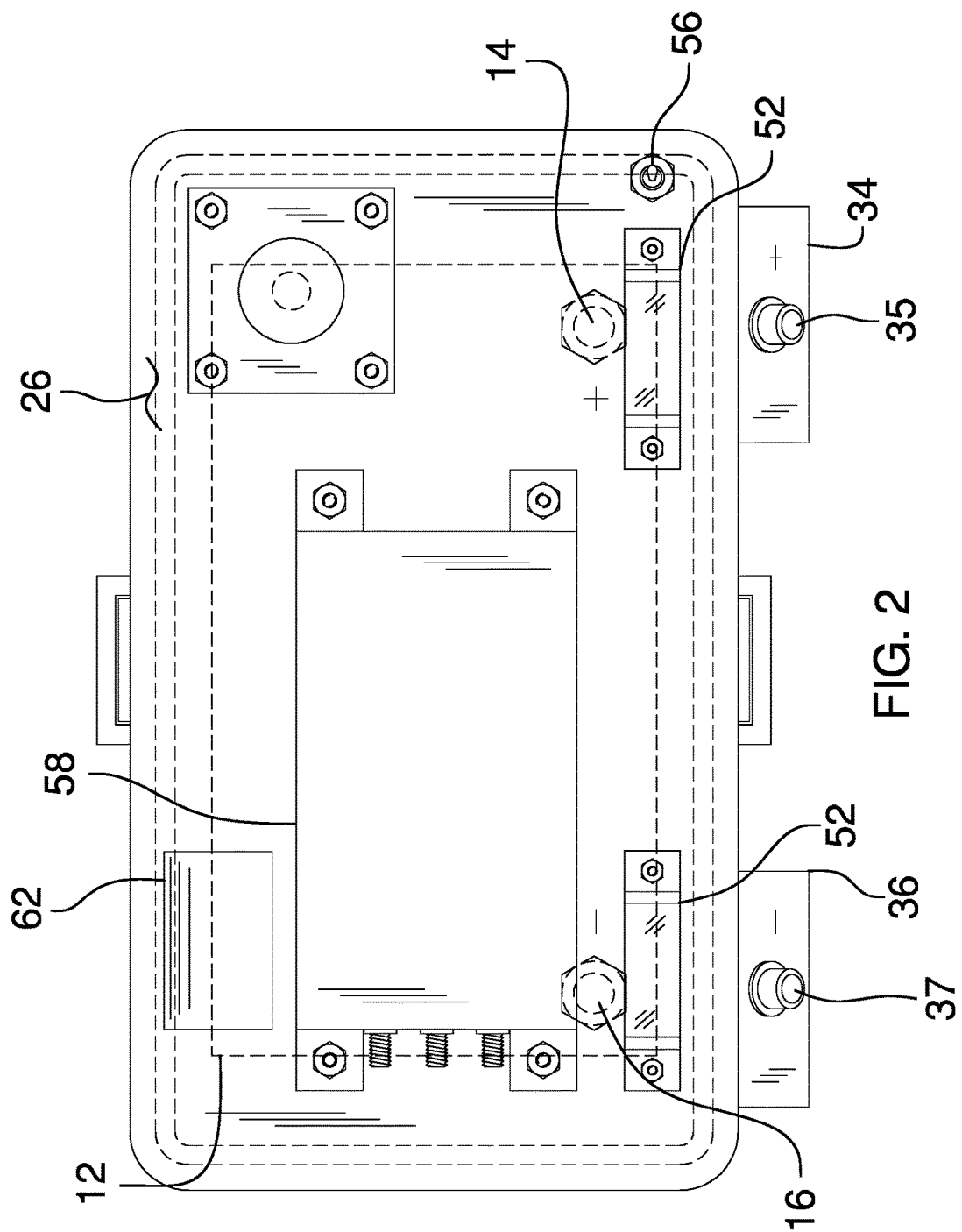
FIG. 2 is a top phantom view of an embodiment of the disclosure.
Figure 3:
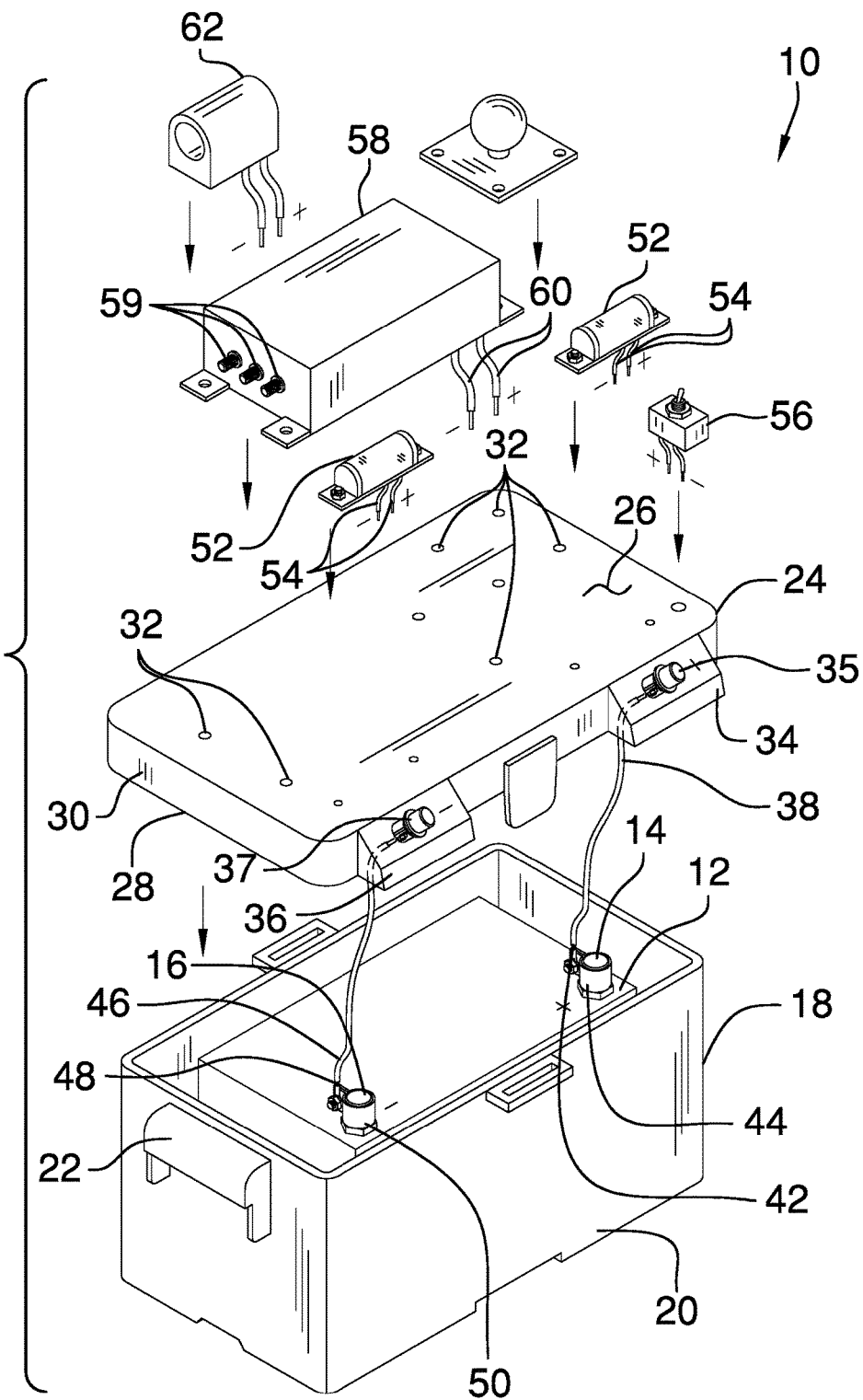
FIG. 3 is an exploded perspective view of an embodiment of the disclosure.
Figure 4:
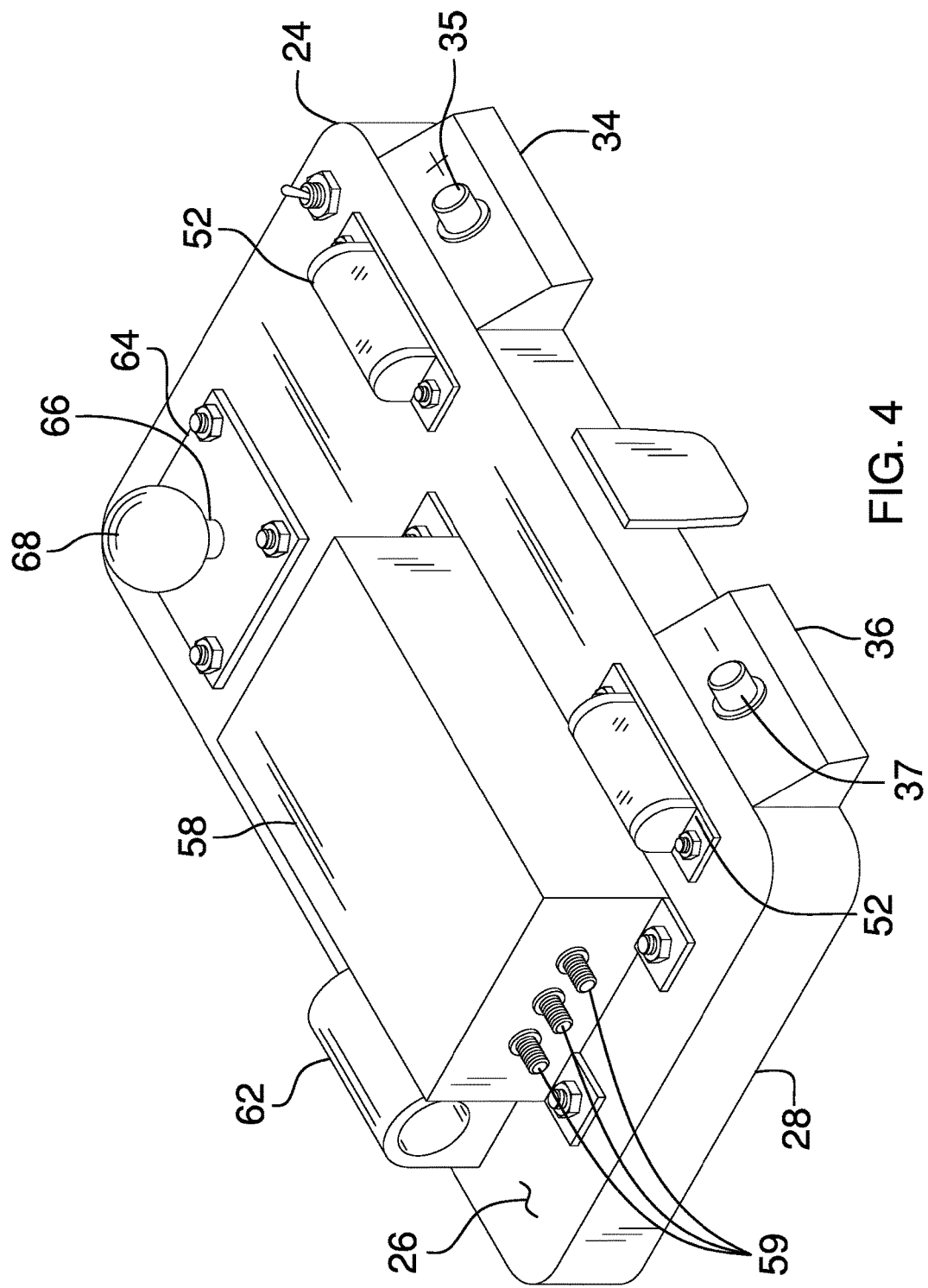
FIG. 4 is a perspective view of a lid of an embodiment of the disclosure.
Figure 5:
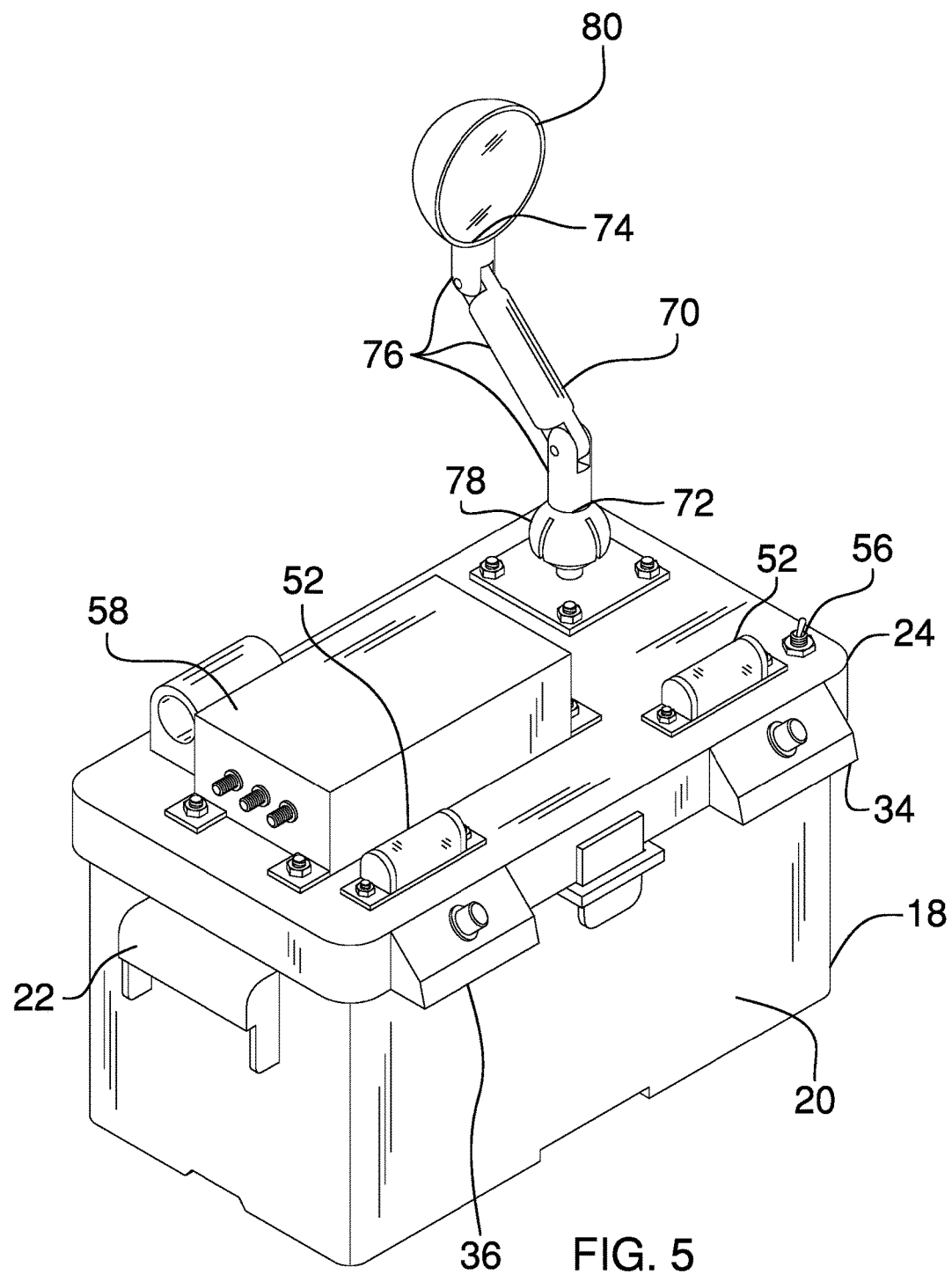
FIG. 5 is a top perspective view of an embodiment of the disclosure.
Figure 6:
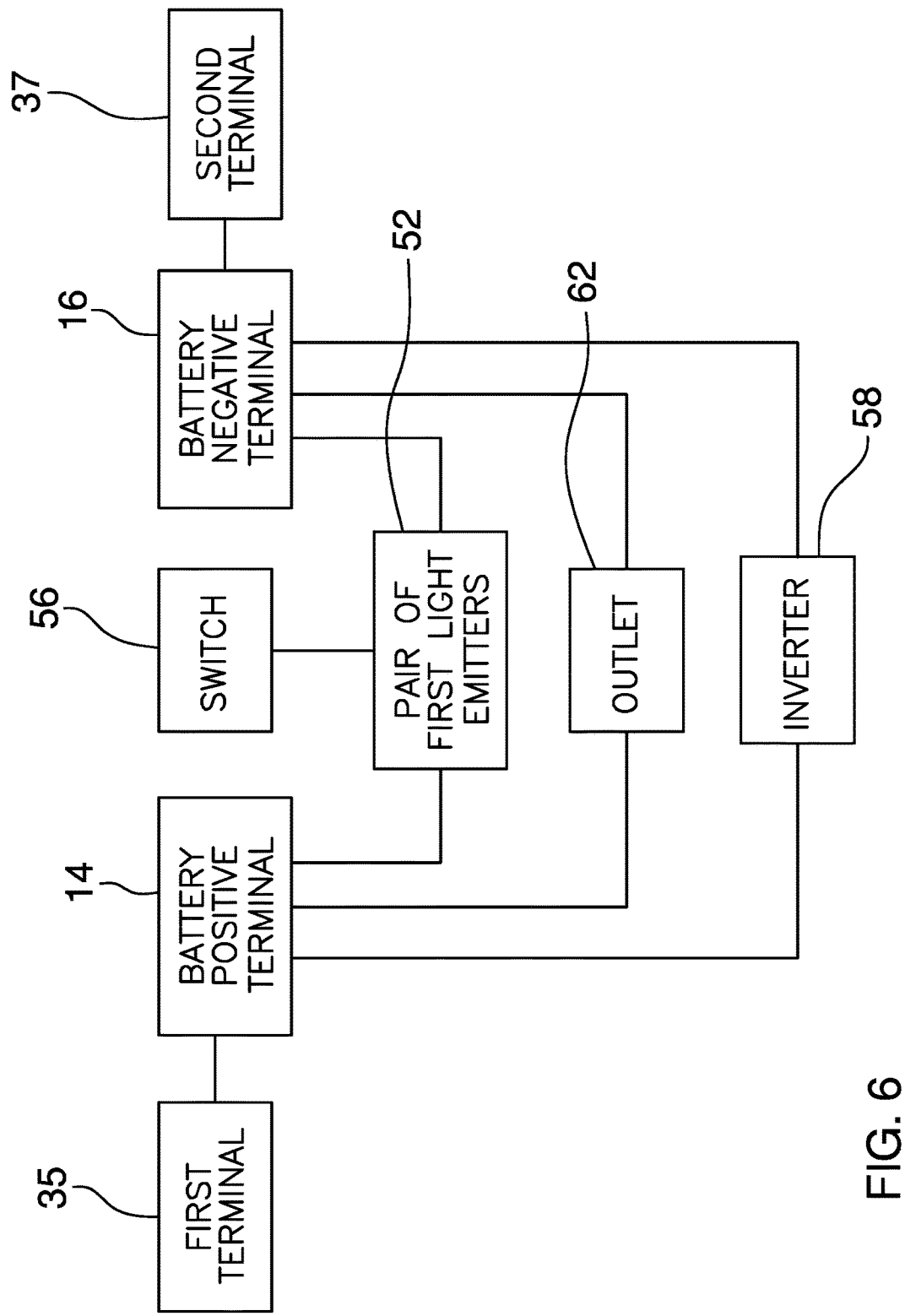
FIG. 6 is a schematic view of an embodiment of the disclosure.

With reference now to the drawings, and in particular to FIGS. 1 through 6 thereof, a new power supply device embodying the principles and concepts of an embodiment of the disclosure and generally designated by the reference numeral 10 will be described.

A battery 12 is provided that has a positive terminal 14 and a negative terminal 16. The battery 12 may be a twelve volt deep cycle battery 12 or the like. A box 18 is provided and the battery 12 is positioned in the box 18. The box 18 has an outer wall 20 and a pair of handles 22 is coupled to the outer wall 20 for carrying the box 18. The handles 22 may each be positioned on opposite sides of the box 18. The box 18 may be comprised of a corrosion resistant material such that the box 18 resists being corroded by acid spilling from the battery 12.

A lid 24 is provided and the lid 24 is removably coupled to the box 18. The lid 24 has a top surface 26, a bottom surface 28 and a peripheral edge 30. The lid 24 has a plurality of apertures 32 extending through the top surface 26 and the bottom surface 28. The apertures 32 are spaced apart from each other and are distributed on the lid 24. A first tab 34 is coupled to and extends outwardly from the peripheral edge 30. A second tab 36 is coupled to and extends outwardly from the peripheral edge 30. The lid 24 may removably engage the box 18 with complementary locks and catches. A first terminal 35 is coupled to the first tab 34 and a second terminal 37 is coupled to the second tab 36.

A first conductor 38 is electrically coupled to the first terminal 35 and the first conductor 38 has a distal end 42 with respect to the first terminal 35. The distal end 42 is electrically coupled to the positive terminal 14 on the battery 12. A first connector 44 may be electrically coupled to the distal end 42 of the first conductor 38. The first connector 44 may be electrically coupled to the positive terminal 14 on the battery 12. Moreover, the first connector 44 may be a battery 12 terminal connector or the like.

A second conductor 46 is electrically coupled to the second terminal 37 and the second conductor 46 has a distal end 48 with respect to the second terminal 37. The distal end 48 of the second conductor 46 is electrically coupled to the negative terminal 16 on the battery 12. A second connector 50 may be electrically coupled to the distal end of the second conductor 46. The second connector 50 may be electrically coupled to the negative terminal 16 on the battery 12. Additionally, the second connector 50 may be a battery 12 terminal connector or the like.

A pair of first light emitters 52 is provided and each of the first light emitters 52 is removably coupled to the lid 24. Each of the first light emitters 52 selectively emits light outwardly from the lid 24. Each of the first light emitters 52 is electrically coupled to the positive terminal 14 and the negative terminal 16 on the battery 12. Each of the first light emitters 52 may be an LED of the like. Additionally, each of the first light emitters 52 includes a pair of conductors 54 and each of the conductors 54 is electrically coupled to an associated one of the positive 14 and negative 16 terminals on the battery 12. Each of the conductors 54 associated with the first light emitters 52 may extend through a selected one of the apertures 32 in the lid 24.

Each of the first light emitters 52 is aligned with an associated pair of the apertures 32 in the lid 24. A pair of fasteners extends through each of the light emitters and engages the associated pair of apertures 32 to retain the light emitters on the lid 24. A switch 56 is coupled to the lid 24 and the switch 56 may be manipulated. The switch 56 is electrically coupled to each of the first light emitters 52 such that the switch 56 turns each of the first light emitters 52 on and off.

An inverter 58 is removably coupled to the lid 24 and the inverter 58 may be electrically coupled to an electric device thereby facilitating the inverter 58 to supply AC current to the electric device. The inverter 58 is electrically coupled to the positive terminal 14 and the negative terminal 16 on the battery 12. The inverter 58 may be an electrical power inverter 58 of any conventional design and the inverter has a plurality of outputs 59.

The inverter 58 is aligned with an associated set of the apertures 32 in the lid 24. A plurality of fasteners extends through the inverter 58 and engages the associated apertures 32 to retain the inverter 58 on the lid 24. The inverter includes a plurality of outputs 59 and the inverter 58 may include a pair of conductors 60. Each of the conductors 60 is electrically coupled to an associated one of the positive 14 and negative 16 terminals on the battery 12. Each of the conductors 60 associated with the inverter 58 may extend through a selected one of the apertures 32 in the lid 24.

An outlet 62 is provided and the outlet 62 is removably coupled to the lid 24. The outlet 62 may have an electric device electrically coupled thereto thereby facilitating the outlet 62 to charge the electric device. The outlet 62 may be a cigarette lighter adapter or the like and the outlet 62 is electrically coupled to the positive terminal 14 and the negative terminal 16 on the battery 12.

A plate 64 is provided and the plate 64 is removably coupled to the lid 24. The plate 64 is aligned with an associated set of the apertures 32. A plurality of fasteners extends through the plate 64 and engages the associated apertures 32 such that the plate 64 is retained on the lid 24. A stem 66 is coupled to and extends upwardly from the lid 24 a ball 68 is coupled to the stem 66. The ball 68 is spaced from plate 64.

An arm 70 is provided that has a first end 72 and a second end 74. The arm 70 comprises a plurality of hinged sections 76 such that the arm 70 is positionable in a selected orientation. A bowl 78 is coupled to the first end 72 of the arm 70. The bowl 78 insertably receives the ball 68 such that the arm 70 is movably coupled to ball 68. A second light emitter 80 is coupled to the second end 74 of the arm 70 to emit light outwardly therefrom. The second light emitter 80 may be a battery powered light emitter or the like.

In use, the battery 12 is positioned in the box 18. The first conductor 38 is electrically coupled to the positive terminal 14 on the battery 12. The second conductor 46 is electrically coupled to the negative terminal 16 on the battery 12. The conductors 54,60 associated with each of the first light emitters 52 and the inverter 58 is electrically coupled to the associate positive 14 and negative 16 terminals on the battery 12. The lid 24 is positioned on the box 18 to retain the battery 12 within the box 18. The switch 56 is manipulated to selectively turn on each of the first light emitters 52 to illuminate a darkened area.

A 12.0 volt electric device is selectively electrically coupled to the first terminal 35 and the second terminal 37 on the lid 24 to power the 12.0 volt electric device. Additionally, a 12.0 volt electric device is selectively electrically coupled to the outlet 62 on the lid 24 to power the 12.0 vole electric device. An electric device requiring AC current is selectively electrically coupled to the outputs 59 on the inverter 58 to power the electric device requiring AC current. In this way a selected electric device is powered in a location that does not have electrical power available. The battery 12 is replaced when the battery 12 is depleted.

With respect to the above description then, it is to be realized that the optimum dimensional relationships for the parts of an embodiment enabled by the disclosure, to include variations in size, materials, shape, form, function and manner of operation, system and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A portable power supply system being configured to provide DC current and AC current, said system comprising:
   a battery having a positive terminal and a negative terminal;
   a box having said battery being positioned therein;
   a lid being removably coupled to said box;
   a pair of first light emitters, each of said first light emitters being removably coupled to said lid wherein each of said light emitters is configured to emit light outwardly from said lid;
   an inverter being removably coupled to said lid wherein said inverter is configured to be electrically coupled to an electric device thereby facilitating said inverter to supply AC current to the electric device;
   a ball being removably coupled to said lid; and
   an arm, said arm including a bowl, said bowl insertably receiving said ball such that said arm is movably coupled to said ball, said arm comprising a plurality of hinged sections such that said arm is positionable in a selected orientation.

2. The system according to claim 1, wherein said lid has a top surface and a peripheral edge, said peripheral edge having a first tab extending outwardly therefrom, said peripheral edge having a second tab extending outwardly therefrom.

3. The system according to claim 2, further comprising a first terminal being coupled to said first tab wherein said first terminal is configured be electrically coupled to an electrical device.

4. The system according to claim 3, further comprising a first conductor being electrically coupled to said first terminal, said first conductor having a distal end with respect to said first terminal, said distal end being electrically coupled to said positive terminal on said battery.

5. The system according to claim 2, further comprising a second terminal being coupled to said second tab wherein said second terminal is configured be electrically coupled to an electrical device.

6. The system according to claim 5, further comprising a second conductor being electrically coupled to said second terminal, said second conductor having a distal end with respect to said second terminal, said distal end of said second conductor being electrically coupled to said negative terminal on said battery.

7. The system according to claim 1, wherein each of said light emitters is electrically coupled to each of positive terminal and said negative terminal on said battery.

8. The system according to claim 1, further comprising a switch being coupled to said lid wherein said switch is configured to be manipulated, said switch being electrically coupled to each of said first light emitters such that said switch turns each of said first light emitters on and off.

9. The system according to claim 1, wherein said inverter is electrically coupled to said positive terminal and said negative terminal on said battery.

10. The system according to claim 1, further comprising an outlet being removably coupled to said lid wherein said outlet is configured to have an electric device electrically coupled thereto thereby facilitating said outlet to charge the electric device, said outlet being electrically coupled to said positive terminal and said negative terminal.

11. The system according to claim 1, further comprising a second light emitter being coupled to said arm wherein second light emitter is configured to emit light outwardly therefrom.

12. A portable power supply system being configured to provide DC current and AC current, said system comprising:
    a battery having a positive terminal and a negative terminal;
    a box having said battery being positioned therein;
    a lid being removably coupled to said box, said lid having a top surface and a peripheral edge, said peripheral edge having a first tab extending outwardly therefrom, said peripheral edge having a second tab extending outwardly therefrom;
    a first terminal being coupled to said first tab wherein said first terminal is configured be electrically coupled to an electrical device;
    a second terminal being coupled to said second tab wherein said second terminal is configured be electrically coupled to an electrical device;
    a first conductor being electrically coupled to said first terminal, said first conductor having a distal end with respect to said first terminal, said distal end being electrically coupled to said positive terminal on said battery;
    a second conductor being electrically coupled to said second terminal, said second conductor having a distal end with respect to said second terminal, said distal end of said second conductor being electrically coupled to said negative terminal on said battery;
    a pair of first light emitters, each of said first light emitters being removably coupled to said lid wherein each of said light emitters is configured to emit light outwardly from said lid, each of said light emitters being electrically coupled to said positive terminal and said negative terminal on said battery;
    a switch being coupled to said lid wherein said switch is configured to be manipulated, said switch being electrically coupled to each of said first light emitters such that said switch turns each of said first light emitters on and off;
    an inverter being removably coupled to said lid wherein said inverter is configured to be electrically coupled to an electric device thereby facilitating said inverter to supply AC current to the electric device, said inverter being electrically coupled to said positive terminal and said negative terminal on said battery;
    an outlet being removably coupled to said lid wherein said outlet is configured to have an electric device electrically coupled thereto thereby facilitating said outlet to charge the electric device, said outlet being electrically coupled to said positive terminal and said negative terminal on said battery;
    a ball being removably coupled to said lid;
    an arm being removably coupled to said lid, said arm including a bowl, said bowl insertably receiving said ball such that said arm is movably coupled to ball, said arm comprising a plurality of hinged sections such that said arm is positionable in a selected orientation; and
    a second light emitter being coupled to said arm wherein second light emitter is configured to emit light outwardly therefrom.

\* \* \* \* \*